United States Patent Office 2,978,294
Patented Apr. 4, 1961

2,978,294

SOLVENT EXTRACTION PROCESS FOR PROTACTINIUM

Earl K. Hyde and Leonard I. Katzin, Chicago, and Michael J. Wolf, Peoria, Ill., assignors to the United States of America as represented by the United States Atomic Energy Commission No Drawing. Filed May 12, 1948, Ser. No. 26,724

7 Claims. (Cl. 23—14.5)

This invention relates to the separation of protactinium from an aqueous solution by solvent extraction and more especially relates to the separation of protactinium from a mixture of protactinium and thorium by a solvent extraction process.

Protactinium occurs in nature as the decay product of uranium Y, a short-lived beta-emitting thorium isotope which in turn is formed from the very long-lived uranium isotope, $U^{235}$, found to the extent of 0.7% in natural uranium. Protactinium, therefore, occurs naturally only in uranium ores, and to the extent of about 0.25 part protactinium per million parts of uranium, this value being fixed by the relative decay rates of $U^{235}$ and $Pa^{231}$. For comparison, radium is present at 0.35 part per million of uranium. The formidable task of isolating protactinium occurring in such a minute concentration is somewhat lightened by the availability of waste fractions from the commercial processing of uranium ores which contain slightly greater concentrations of protactinium and which are more amenable to chemical treatment than the raw ores. During the processing of such uranium ores the major portion of the uranium and some of the other constituents are dissolved in nitric acid. By the addition of sodium carbonate some of the dissolved impurities, which include protactinium, polonium, ionium ($Th^{230}$), and radium are precipitated. This sodium carbonate precipitate is available for recovery of protactinium by separation from thorium and the other constituents.

In some of the processes for recovery of protactinium from uranium ores, carrier precipitation techniques were developed using tantalum and zirconium compounds. Using the tantalum carrier technique the product obtained was substantially tantalum and contained not more than about 0.1% protactinium. In the zirconium carrier technique, it was necessary to separate protactinium from zirconium by fractional crystallization of zirconium oxychloride.

With the development of the uranium-graphite pile for production of plutonium, fission products, and energy, it was found that an increased utilization of neutrons could be accomplished by the use of a blanket of thorium or a thorium-containing material around the pile. By the use of this blanket the thorium isotope, $Th^{232}$, absorbed neutrons to form $Th^{233}$, which decayed by beta-emission to $Pa^{233}$. This protactinium isotope decayed by beta-emission to $U^{233}$. The half-lives of $Th^{233}$ and $Pa^{233}$ are twenty-three minutes and twenty-seven and four-tenths days, respectively. Since $U^{233}$ is fissionable, it is desirable to remove it from the thorium blanket before the concentration of $U^{233}$ becomes very high. Otherwise, there are fission products of $U^{233}$ in the blanket so that the purification of thorium for re-use in the blanket cannot be carried out by a simple procedure. This purification of thorium could be accomplished by removing the blanket from the pile after a certain period of irradiation and storing the blanket for a sufficient period of time to allow substantially all of the protactinium present to decay to $U^{233}$. In such a case it would be necessary only to separate $U^{233}$ from thorium. However, this would necessitate the storage of the material for a considerable length of time. By the use of a storage period in a purification process the amount of time that thorium could be used as a blanket would be much less than in the case of a purification process requiring no storage period. To eliminate the storage period from the purification process it is necessary to separate protactinium as well as uranium from thorium. This can be accomplished either by first removing $U^{233}$ by known processes and then separating $Pa^{233}$ from thorium or by separating $U^{233}$ and $Pa^{233}$ simultaneously from thorium. The amounts of $Pa^{233}$ and $U^{233}$ produced by the neutron-irradiation of thorium are quite small, rarely being above 1% by weight of thorium and usually being substantially below this concentration. Thus, it is necessary to recover $Pa^{233}$ and $U^{233}$ from thorium masses having $U^{233}$ and $Pa^{233}$ concentrations below one part per thousand parts and even one part per million parts of thorium.

In all of the foregoing materials containing protactinium the materials are dissolved by strong inorganic acids and the resultant aqueous solutions usually contain very dilute concentrations of protactinium salts.

It is an object of this invention to separate protactinium from aqueous solutions of protactinium salts.

It is another object of the present invention to separate protactinium from mixtures of protactinium and thorium.

It is still a further object of the present invention to separate protactinium and uranium from a mixture of protactinium, uranium, and thorium.

Still another object of this invention is to provide a process for separating protactinium from a mixture of protactinium and zirconium.

Other objects of the present invention will be apparent from the description which follows.

We have found that protactinium can be separated from an aqueous solution of a protactinium salt by providing the aqueous solution with a strong inorganic acid in a concentration of 0.1 to 10 N and contacting the aqueous solution with a certain type of organic solvent.

More particularly, the process of this invention comprises contacting an aqueous solution containing a water-soluble protactinium salt and a strong inorganic acid in a concentration of 0.1 to 10 N with an aliphatic oxygen-containing organic solvent having at least six carbon atoms and selected from the group consisting of alcohols, ketones, and esters, and mixtures thereof, and separating the resultant aqueous phase and organic solvent extract phase containing protactinium salt.

As will be seen hereinafter, it is necessary, when extracting a protactinium salt from an aqueous solution by a solvent of this invention, that at least 0.1 N strong inorganic acid be present in the aqueous phase; otherwise, there is no protactinium extraction or the amount of extraction is negligible. Examples of suitable strong inorganic acids are nitric acid and hydrochloric acid. It is desirable that the concentration of inorganic acid be 10 N or below, especially in the case of reactive acids, such as nitric acid, in order to reduce the reaction of the acid with an organic solvent of this invention. It is preferred that the concentration of strong inorganic acid be between 0.5 and 5 N. This is especially true when it is desired to separate protactinium from a mixture of protactinium and thorium using an aqueous solution, since at the higher acid concentrations there is an increased amount of thorium extraction.

The aliphatic oxygen-containing organic solvents of the present invention are preferably alcohols, ketones, and esters having at least six carbon atoms, since alcohols, ketones, and esters having less than six carbon atoms appear to be practically ineffective for the extraction of protactinium. Also, low-molecular-weight alcohols, ketones and esters are miscible with water. Examples of suitable alcohols, ketones, and esters are:

n-heptanol
n-octanol
2-ethylhexanol
heptadecanol (3,9-diethyl-6-tridecanol)
methyl isobutyl ketone
diisopropyl ketone
methyl n-amyl ketone
sec-butyl acetate
n-butyl acetate
n-amyl acetate In the process of the present invention it is possible to increase the percentage of protactinium salt extraction at the lower concentrations of strong inorganic acid by having in the aqueous solution before extraction a salting-out agent, i.e., an inorganic compound, which is water-soluble and which will cause a salting-out action on the protactinium salt, so that the distribution coefficient of the protactinium salt between organic solvent and aqueous phase is increased. Examples of suitable salting-out agents when nitric acid is used as the strong inorganic acid are:

ammonium nitrate
calcium nitrate
aluminum nitrate
magnesium nitrate
manganese nitrate
thorium nitrate When a strong inorganic acid other than nitric acid is used, the analogous salts of that acid are preferably used. Of course, when it is desired to separate protactinium from large amounts of thorium, the aqueous solution obtained by dissolving such a mixture will contain a considerable concentration of a thorium salt, such as thorium nitrate. It will be unnecessary in most instances to add an auxiliary salting-out agent to increase the degree of protactinium extraction. This is especially true when the acid concentration is 1 N or more.

In one embodiment of the present invention protactinium is separated from an aqueous solution containing 0.1 to 10 N strong inorganic acid by contacting with a solvent of the type described above. It is preferable that the contact time be sufficient for an equilibration of the protactinium salt between the aqueous phase and the solvent extract phase. After contacting, the phases are separated and the organic extract phase contains protactinium salt. In this embodiment, a salting-out agent of the type described above may be present.

In a second embodiment of this invention, the process of the first embodiment is carried out and the protactinium salt is separated from the organic solvent extract phase by contacting the extract phase with water. When the original extraction of protactinium salt is from an aqueous solution having a high acidity, i.e., 3 N or above, a considerable amount of strong inorganic acid is extracted by the organic solvent. As a result, when the extract phase is contacted with water, the acid is extracted by the water providing a relatively high acidity in the aqueous phase, thereby reducing the degree of extraction of protactinium into the aqueous extract phase. In such a case, it is desirable to contact the organic solvent extract phase with a small amount of water for removal of the inorganic acid and, after separating the acidic aqueous phase, to contact the organic solvent extract phase with an additional amount of water and finally to separate the resultant aqueous extract phase containing protactinium salt.

In this embodiment, it is preferred, when greater than micro-amounts of protactinium are re-extracted, that the water used for re-extraction contain a complexing agent for protactinium so that the protactinium remains in a form easily extractable from an acidic solution by the organic solvents of this invention. This is particularly to be preferred when it is desired to repeat at least once the complete cycle of this embodiment. Suitable complexing agents are oxalic acid and its water-soluble salts.

If water alone is used for re-extraction, protactinium extracted by the water becomes hydrolyzed producing a compound, which is nonextractable by these organic solvents. At the present time the chemical nature of the nonextractable protactinium is not known; however, it is only by treatment of the compound with a concentrated solution of a strong inorganic acid, such as nitric acid, that the nonextractable compound is converted to an extractable protactinium compound, such as protactinium nitrate.

Another embodiment consists only of the extraction of a protactinium salt from an organic solvent of the type disclosed above by contacting with water or an aqueous solution of a complexing agent of the type described above.

In a fourth embodiment protactinium is separated from a mixture of protactinium and thorium by extracting a protactinium salt from an aqueous solution containing said protactinium salt, a thorium salt, and 0.1 to 10 N strong inorganic acid in accordance with the process of the first embodiment. When the mixture also contains uranium, the process separates protactinium and uranium from the mixture.

In another embodiment protactinium is separated from a mixture of protactinium and zirconium by treating an aqueous solution of their salts and containing 0.1 to 10 N strong inorganic acid in accordance with the process of the first embodiment.

In still a further embodiment protactinium and polonium are separated from a mixture of protactinium, polonium and thorium, such as is obtained as a carbonate precipitate in the uranium recovery process mentioned above. This embodiment also utilizes the process of the first embodiment.

In all of these embodiments the contact time may be varied widely but it was found that with adequate mixing several minutes was sufficient. The temperature of the solutions can be varied considerably below the boiling points of the solutions. However, it is preferred to operate at about room temperature. The ratio of aqueous solution to organic solvent in the extraction or re-extraction may be varied widely, for example, between 10:1 and 1:10.

In the solvent extraction experiments reported below in Tables I to XI inclusive, the aqueous solutions were prepared from concentrated stock solutions of thorium nitrate, nitric acid, ammonium nitrate and the various other salting-out agents. The proper amounts of these stock solutions and of distilled water were delivered from burets to a 15-ml. calibrated, glass-stoppered centrifuge cone to make 5 ml. of solution of a desired composition. Then $Pa^{233}$ tracer, as nitrate, was added. Since $Pa^{233}$ has a short half-life, the amount of tracer used in the various experiments varied between 10,000 and 300,000 beta counts per minute at 10% counting yield. Tracer $U^{233}$, as uranyl nitrate, in the amount of 5,000 to 10,000 counts per minute at 52% counting yield was also added to the aqueous solutions used in the experiments reported in Table I to determine the percentage of uranium extraction. In each experiment an equal volume of the particular organic solvent was added, the cone was shaken for five minutes, and the layers were cleanly separated by centrifugation. Aliquots of the solvent layer were analyzed for thorium and uranium salts when present in the original aqueous solution and for protactinium salt.

To determine the percentage of thorium extraction, excess saturated oxalic acid in 1 N hydrochloric acid was added to a 2-ml. aliquot of the solvent layer to precipitate thorium oxalate. The precipitate was separated by filtration and was washed. It was dissolved with slight heating in an excess of standard ceric sulfate and the excess of ceric sulfate was determined by back-titrating with standard ferrous ammonium sulfate to the ferroin end point.

To determine the percentage of uranium extraction a 0.5-ml. aliquot of the solvent layer was shaken with 0.5 ml. of distilled water in a 5-ml. centrifuge cone. After the separation of aqueous and organic solvent layers the cone was immersed in a Dry Ice-acetone bath to freeze the aqueous layer. The organic solvent was poured out of the cone and it was discarded. The frozen aqueous layer was warmed to room temperature to liquefy. The aqueous layer was evaporated on a platinum disc and the amount of $U^{233}$ on the disc was determined by measuring the alpha disintegration rate in a standard pulse ionization chamber. When the amount of thorium extracted from the initial aqueous solution was more than 2%, it was necessary to remove it from the aqueous extract of the organic solvent aliquot prior to evaporating the aqueous extract on the platinum disc. This was done by adding a few drops of 6 N hydrofluoric acid to precipitate thorium tetrafluoride, evaporating the supernatant solution on a platinum disc and counting $U^{233}$. This separation of thorium reduced the uranium content of the aqueous extract, and a 10% correction was applied to the percentage of uranium extraction.

To determine the percentage of protactinium extraction 0.25-ml. to 2-ml. aliquots of the solvent layer were evaporated over water to obtain aqueous solutions of protactinium nitrate. These solutions were evaporated on either a platinum plate or a 1-inch diameter watch glass. The dry samples were counted on a standard Geiger-Müller beta counter.

TABLE I

*Extraction of 1 N nitric acid solutions containing 3 N ammonium nitrate, 2 N thorium nitrate, and tracer uranyl and protactinium nitrates*

| Organic solvent | Percent U extracted | Percent Th extracted | Percent Pa extracted |
| --- | --- | --- | --- |
| n-Heptanol | 24 | 0.7 | 74 |
| n-Heptanol | | 1 2.7 | 1 72 |
| n-Octanol | | 0.5 | 75 |
| 2-Ethylhexanol | | | 72 |
| Heptadecanol | | 0 | 32 |
| Methyl isobutyl ketone | 57 | 2 | 21 |
| Diisopropyl ketone | 56 | 0.3 | 49 |
| Methyl n-amyl ketone | 47 | 0.9 | 3 |
| Sec-butyl acetate | 39 | | 22 |
| n-Butyl acetate | 39 | 0.1 | 11 |
| n-Amyl acetate | 31 | 0.3 | 2 32 |

1 From a solution 2 N aluminum nitrate and 3 N thorium nitrate instead of 3 N ammonium nitrate and 2 N thorium nitrate.
2 From a solution 2 N instead of 3 N ammonium nitrate.

The data of Table I show that the organic solvents of this invention are effective for separating protactinium from aqueous solution and for separating protactinium from mixtures of thorium and protactinium, as well as separating protactinium and uranium from mixtures of thorium, protactinium and uranium.

TABLE II

*Diisopropyl ketone extraction of solutions of tracer protactinium nitrate and varying nitric acid concentration*

Nitric acid, N:     Percent Pa extracted
0 ------------------------------- 0.2
0.1 ----------------------------- 0.5
0.5 ----------------------------- 8
2 ------------------------------- 53
4 ------------------------------- 72
5 ------------------------------- 67
6 ------------------------------- 73
8 ------------------------------- 75

The values of Table II show the necessity of using a strong inorganic acid in the aqueous solution from which a protactinium salt is to be extracted.

TABLE III

*Diisopropyl ketone extraction of 1 N nitric acid solutions containing salting-out agents and tracer protactinium nitrate*

| Ammonium nitrate, N | Aluminum nitrate, N | Calcium nitrate, N | Magnesium nitrate, N | Manganese nitrate, N | Percent Pa extracted |
| --- | --- | --- | --- | --- | --- |
| 0.5 | | | | | 58 |
| 1 | | | | | 56 |
| 2 | | | | | 66 |
| 3 | | | | | 77 |
| 3 | | | | | 77 |
| 5 | | | | | 81 |
| 7 | | | | | 74 |
| 9 | | | | | 81 |
| | 0.5 | | | | 67 |
| | 2 | | | | 75 |
| | 4 | | | | 79 |
| | | 1 | | | 71 |
| | | 2 | | | 74 |
| | | 4 | | | 71 |
| | | 6 | | | 63 |
| | | 8 | | | 67 |
| | | | 0.25 | | 1 65 |
| | | | 0.54 | | 1 76 |
| | | | 1 | | 1 80 |
| | | | 2 | | 1 76 |
| | | | 3 | | 1 73 |
| | | | 4 | | 1 69 |
| | | | 6 | | 1 67 |
| | | | 7 | | 1 66 |
| | | | | 0.25 | 50 |
| | | | | 0.5 | 59 |
| | | | | 1 | 73 |
| | | | | 2 | 73 |
| | | | | 4 | 73 |
| | | | | 5 | 66 |
| | | | | 6 | 71 |

1 Pretreated diisopropyl ketone, i.e., the ketone was equilibrated with 1 N nitric acid solution containing same magnesium nitrate concentration but no tracer Pa before use.

The effect of various salting-out agents on the degree of protactinium salt extraction is apparent from Table III, since about 40% protactinium is extracted from 1 N nitric acid solution containing tracer protactinium nitrate and no salting-out agent. The approximate value of 40% was obtained by plotting the data of Table II. At the intermediate concentrations of salting-out agents the maximum extractions were obtained.

TABLE IV

*Diisopropyl ketone extraction of 3 N thorium nitrate solutions containing 2 N aluminum nitrate, tracer protactinium nitrate and varying nitric acid concentration*

| Nitric acid, N | Percent Pa extracted | Percent Th extracted |
| --- | --- | --- |
| 0 | 6.5 | 0.6 |
| 1 | 78 | 2.2 |
| 2 | 72 | 5.4 |
| 3 | 88 | 4.3 |

The value of nitric acid to increase the extraction of protactinium is apparent from the foregoing data of Table IV. When no nitric acid was used, thorium nitrate, by hydrolysis, provided some nitric acid. The presence of this acid and the use of salting-out agents, viz., thorium and aluminum nitrates, account for the value of 6.5% Pa extracted.

TABLE V

*Diisopropyl ketone extraction of 3 N thorium nitrate solutions containing 1 N nitric acid, tracer protactinium nitrate and varying calicum nitrate concentration*

| Calcium nitrate, N | Percent Pa extracted | Percent Th extracted |
| --- | --- | --- |
| 0 | 78 | 0.3 |
| 2 | 86 | 1.4 |
| 3 | 81 | 4.6 |
| 5 | 82 | 4.4 |
| 6 |  | 19 |

The extraction data of Table V show that, when it is desired to separate protactinium from a mixture of protactinium and thorium and a salting-out agent is used, the total nitrate concentration should be preferably 6 normal or less.

TABLE VI

*Diisopropyl ketone extraction of 2.5 N thorium nitrate solutions containing 1 N nitric acid, tracer protactinium nitrate and varying magnesium nitrate concentration*

| Magnesium nitrate, N | Percent Pa extracted | Percent Th extracted |
| --- | --- | --- |
| 0 | 61 | 0.8 |
| 0.4 | 87 | 1 |
| 0.8 | 88 | 1.6 |
| 1.7 | 93 | 3.6 |
| 2.5 | 93 | 6.1 |
| 4.2 | 81 | 16 |

TABLE VII

*Diisopropyl ketone extraction of 3 N thorium nitrate solutions containing 0.06 N nitric acid, tracer protactinium nitrate and varying magnesium nitrate concentration*

| Magnesium nitrate, N | Percent Pa extracted | Percent Th extracted |
| --- | --- | --- |
| 0 | 6.2 | 0.1 |
| 0.5 | 7.2 | 0.1 |
| 1 | 6.7 | 0.1 |
| 3 | 5.8 | 1.9 |
| 4 | 6.8 | 5.8 |
| 5 | 4.8 | 14 |

TABLE VIII

*Diisopropyl ketone extraction of 3 N thorium nitrate solutions having pH of 1.5 and containing tracer protactinium nitrate and varying magnesium nitrate concentration*

| Magnesium nitrate, N | Percent Pa extracted | Percent Th extracted |
| --- | --- | --- |
| 0 | 0.2 | 0 |
| 0.5 | 0.3 | 0 |
| 1 | 0.1 | 0.1 |
| 2 | 0.1 | 0.2 |
| 3 | 0.3 | 0.4 |
| 4 | 0.4 | 1.8 |
| 5 | 0.5 | 3.4 |

A comparison of Tables VI, VII and VIII indicates the necessity of at least 0.1 N concentration of a strong inorganic acid in the aqueous solution. The desirability of keeping low the total nitrate concentration for maximum efficiency of separating protactinium from admixture with thorium is apparent from these tables:

TABLE IX

*Diisopropyl ketone extraction of 2 N thorium nitrate containing tracer protactinium nitrate and varying nitric acid and ammonium nitrate concentrations*

| Ammonium nitrate, N | Nitric acid, N | Percent Pa extracted | Percent Th extracted |
| --- | --- | --- | --- |
| 0 | 0.5 | 59 | trace |
| 0 | 1 | 76 | 0.6 |
| 1 | 1 | 76 | 0.6 |
| 2.5 | 0.5 | 76 | trace |
| 3 | 1 | 76 | 0.4 |
| 4.5 | 0.5 | 67 | 0.9 |
| 6 | 1 | 76 | 1.9 |
| 7.5 | 0.5 | 66 | 2.5 |

TABLE X

*Pretreated diisopropyl ketone extraction of 1 N nitric acid solutions containing tracer protactinium nitrate and varying thorium nitrate and magnesium nitrate concentrations*

| Thorium nitrate, N | Magnesium nitrate, N | Percent Pa extracted | Percent Th extracted |
| --- | --- | --- | --- |
| 1 | 0.5 | 86 | 0.1 |
| 3 | 0.5 | 78 | 0.7 |
| 1 | 1 | 86 | 0.2 |
| 3 | 1 | 93 | 1.2 |
| 1 | 2 | 82 | 0.8 |
| 1 | 3 | 85 | 4.3 |
| 1 | 4 | 86 | 8.3 |
| 1 | 6 | 85 | 35 |

Tables IX and X also illustrate various embodiments of the process of the present invention.

TABLE XI

*2-ethylhexanol extraction of 3 N thorium nitrate solutions containing 1 N nitric acid, tracer protactinium nitrate, and varying calcium nitrate concentration*

| Calcium nitrate, N | Percent Pa extracted | Percent Th extracted |
| --- | --- | --- |
| 0 | 71 | 0.4 |
| 2 | 77 | 1 |
| 4 | 77 | 2.4 |
| 6 | 59 | 12 |

The data in Table XI show that there is also an optimum salting-out agent concentration for protactinium separation using another solvent of this invention. Also, it is preferable to keep the salting-out agent concentration at a minimum to keep the thorium extraction as low as possible.

In some of the experiments reported in the foregoing tables the percentage of nitric acid extracted by the organic solvent was determined. In the absence of thorium nitrate or other salting-out agent 15% nitric acid was extracted from 2 N nitric acid solution and 32% nitric acid was extracted from 10 N nitric acid. However, using 0.5 and 1 N nitric acid solutions, as high as 60 to 80% nitric acid extractions were obtained when salting-out agents were present to provide 8 to 10 N total nitrate. At 6 N total nitrate there was between 30 and 50% nitric acid extraction from 0.5 and 1 N nitric acid solutions.

Aqueous solutions each containing a tracer quantity of $Po^{210}$ as polonium chloride, and containing respectively 3, 6 and 9 N hydrochloric acid were prepared. Each solution was equilibrated with an equal volume of diisopropyl ketone. The extraction data are presented below in Table XII. The table also presents the percentage of polonium salt extracted from 1 N nitric acid solution of a tracer amount of $Po^{210}$ as polonium nitrate and containing 1 N manganese nitrate by equilibrium with an equal volume of diisopropyl ketone.

TABLE XII

*Diisopropyl ketone extraction of acidic solutions of tracer polonium salts*

| Hydrochloric acid, N | Nitric acid, N | Manganese nitrate, M | Percent Po extracted |
|---|---|---|---|
| 3 | -------- | -------- | 69 |
| 6 | -------- | -------- | 95 |
| 9 | -------- | -------- | 98 |
| -------- | 1 | 1 | 7 |

At concentrations of nitric acid greater than 1 normal, the percentage of polonium extracted would be more than 7%.

Five milliliters of 1 N nitric acid solution containing 1 N manganese nitrate and tracer quantities of zirconium and columbium salts was prepared. The tracers were salts of $Zr^{95}$ and $Cb^{95}$. A mixture of these elements was used because $Cb^{95}$ is formed in the disintegration of $Zr^{95}$ as follows:

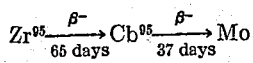

The total beta counts in 20 microliters of the aqueous solution was 4,490 per minute. Twenty microliters of this solution was stirred with 20 microliters of diisopropyl ketone in a small centrifuge cone. After centrifugation the separated layers were removed and each layer was evaporated on a glass plate. The beta activity on each glass plate was determined. The analyses showed that only 3.8% of the beta activity, i.e., 3.8% of the mixture of zirconium and columbium salts, was extracted by the ketone.

In extraction experiments using equal volumes of diisopropyl ketone and hydrochloric acid solutions of a tracer mixture of salts of zirconium ($Zr^{95}$) and columbium ($Cb^{95}$), the relative ineffectiveness of their extraction by solvents of this invention was demonstrated. The data are reported below in Table XIII.

TABLE XIII

*Diisopropyl ketone extraction of acidic solutions of mixed tracer zirconium and columbium chlorides*

| Hydrochloric acid, N: | Percent Zr-Cb extracted |
|---|---|
| 3 | 0.3 |
| 6 | 1.3 |
| 9 | 10 |

In the foregoing examples the extraction of protactinium salts from aqueous solutions of tracer quantities of the salts was described. Conditions for the extraction of macro-concentrations of protactinium salts from solutions containing relatively high concentrations of impurities were found to be somewhat more critical. The salting-out agents, such as manganese and calcium nitrates, result in the formation of colloidal protactinium solutions from which protactinium is not easily extracted. Best results are obtained by using only nitric acid.

Although water alone will re-extract protactinium salts from the organic solvents, the neutral aqueous solution will convert protactinium to a relatively non-extractable state, i.e., it is not possible to extract the protactinium salt from the aqueous extract phase after adjusting with a strong inorganic acid to 0.1 to 10 N concentration by contacting with an organic solvent of this invention. The conversion of protactinium to a non-extractable state can be prevented by using a small amount of a strong inorganic acid in the water. Of course, to permit adequate re-extraction of protactinium salt from the organic solvent, the acid concentration of the aqueous extracting medium should be less than 0.1 normal. A better means of maintaining protactinium in an extractable state is to use an aqueous solution of a complexing agent, such as oxalic acid. A suitable oxalic acid concentration is 0.1 molar. After re-extraction the solution can be treated with an agent for destroying the complexing agent. For example, the ceric salt, $(NH_4)_2 Ce(NO_3)_6$, upon addition to the aqueous solution will destroy the oxalic acid. The protactinium salt may be then extracted from the aqueous solution for further purification with respect to thorium in accordance with this invention.

The following experiments illustrate the re-extraction of protactinium salt from the organic solvent. A diisopropyl ketone solution of tracer protactinium nitrate and containing 1.18 equivalents of nitric acid and 0.153 equivalent of thorium nitrate per liter was contacted with an equal volume of 2 N sodium sulfate solution. In another experiment the ratio of 2 N sodium sulfate to diisopropyl ketone solution was 0.1. The distribution coefficients of protactinium nitrate between the aqueous and ketone phases in these experiments were 30 and 15, respectively. These results indicate that the re-extraction of nitric acid lowers the distribution coefficient. When another portion of this diisopropyl ketone solution of protactinium nitrate was given a preliminary water wash to reduce the nitric acid concentration, the distribution coefficient for protactinium nitrate using 2 N sodium sulfate was 86.

The process of the present invention may be carried out using well-known extraction procedures and apparatus. Thus, the extraction steps may be effected by the use of batch, continuous batch, batch countercurrent or continuous countercurrent methods. In column operation the organic solvent may be either the dispersed phase or the continuous phase.

The foregoing illustrations and embodiments of this invention are not intended to limit its scope, which is to be limited entirely by the appended claims.

What is claimed is:

1. A process for the separation of protactinium from thorium, which comprises contacting an aqueous solution containing protactinium nitrate, a salting-out agent, thorium nitrate, and between 0.1 and 10 N nitric acid with n-amyl acetate, and separating the resultant aqueous phase and the ester extract phase containing protactinium nitrate.

2. A process for the separation of protactinium and thorium, which comprises contacting an aqueous solution containing protactinium nitrate, thorium nitrate, and between 0.1 and 10 normal concentration of nitric acid with an aliphatic oxygen-containing organic solvent having at least six carbon atoms and selected from the group consisting of alcohols, ketones, and esters, and mixtures thereof, and separating the resultant aqueous phase and the organic solvent extract phase containing protactinium nitrate.

3. A process for the separation of protactinium and thorium, which comprises contacting an aqueous solution containing protactinium nitrate, thorium nitrate, calcium nitrate, and between 0.1 and 10 N nitric acid with 2-ethylhexanol, and separating the resultant aqueous phase and the alcohol extract phase containing protactinium nitrate.

4. A process for the separation of protactinium and thorium, which comprises contacting an aqueous solution containing protactinium nitrate, thorium nitrate, a salting-out agent, and between 0.1 and 10 N nitric acid with an aliphatic ketone having at least six carbon atoms, and separating the resultant aqueous phase and ketone extract phase containing protactinium nitrate.

5. The process of claim 4 wherein the salting-out agent is calcium nitrate and the ketone is diisopropyl ketone.

6. The process of claim 4 wherein the salting-out agent is ammonium nitrate and the ketone is diisopropyl ketone.

7. The process of claim 4 wherein the salting-out agent is aluminum nitrate and the ketone is diisopropyl ketone.

References Cited in the file of this patent

UNITED STATES PATENTS 2,227,833    Hixson et al. _____ Jan. 7, 1941

OTHER REFERENCES

Hyde and Wolf: AEC Document TID 5223 (Pt. 1), paper No. 3.12, pp. 197–222 (1952), based on Report CB–3810. Prepared for publication April 30, 1947. (Copy of TID 5223 in Sci. Library.)

Kuaus & Van Winkle: AEC Document TID 5223 (Pt. 1), paper No. 6.2, pp. 259, 261, 264–266 (1952), based on Report CC–3365 (Feb. 26, 1946), on work carried out in the winter of 1944–1945 at the University of Chicago. (Copy of TID 5223 in Sci. Library.)